Aug. 22, 1961 H. SCHMID 2,997,235

ELECTRONIC FUNCTION GENERATORS

Filed April 9, 1958 2 Sheets-Sheet 1

INVENTOR
HERMANN SCHMID

BY Richard D. Stephens

ATTORNEY

INVENTOR
HERMANN SCHMID

BY Richard G. Stephens
ATTORNEY

United States Patent Office 2,997,235

Patented Aug. 22, 1961

2,997,235

ELECTRONIC FUNCTION GENERATORS

Hermann Schmid, Binghamton, N.Y., assignor to General Precision, Inc., a corporation of Delaware Filed Apr. 9, 1958, Ser. No. 727,402

16 Claims. (Cl. 235—186)

Figures 2A, 2B, 2C, 2D, 2E:
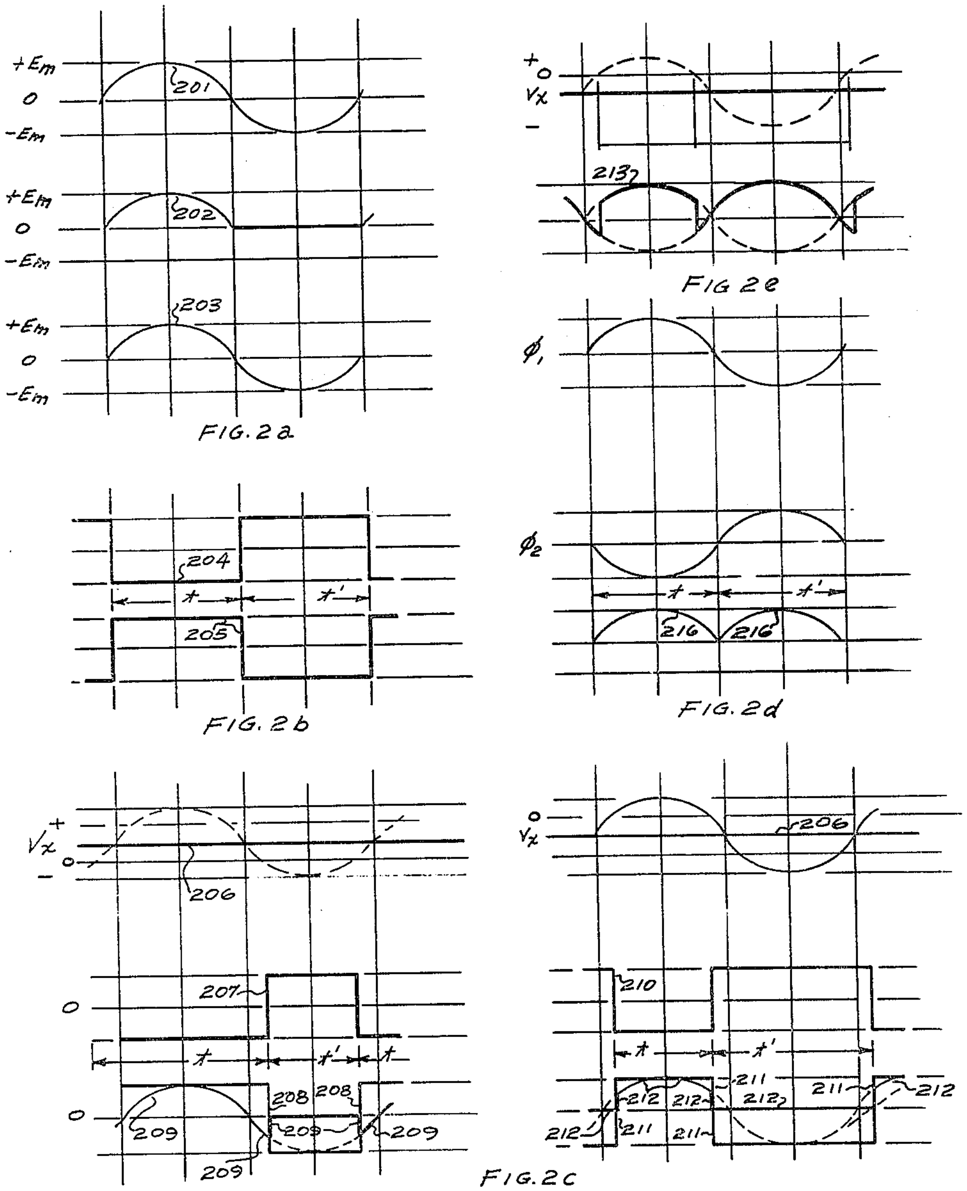

This invention relates to improved electronic function generators, and more particularly, to improved apparatus for deriving output voltages which vary as trigonometric functions of input voltages. In the electronic arts generally, and particularly in the analog computer, automatic control and instrumentation arts wide use is made of such function generators. Probably the most commonly required non-linear functions in analog computer type apparatus are sine and cosine functions. One known type of electronic function generation is known as diode "shaping." This technique involves the use of a plurality of diodes biased to conduct at various different potentials and arranged to draw current so as to cause the output voltage to approximate a desired output function. Diode function generators require numerous diodes in many applications, require tedious calibration, and the change in emissivity of the diodes with age and temperature limits the accuracy of diode function generators. An optical technique is commonly used in a further prior art function generator known as a "photoform" function generator. This device is relatively complex, expensive, and of limited accuracy. Numerous analog computer devices require accuracy of function generator within 0.1%. The only commonly used analog function generator capable of such accuracy is a potentiometer, but since a potentiometer requires a mechanical shaft input it usually must be servo-positioned, so that large, heavy, and expensive installations are necessary. Furthermore, a servo-operated potentiometer function generator is subject to the dynamic limitations of the servo used, usually being limited to very low frequencies, of the order of five cycles per second or less.

The present invention provides an all-electronic transistorized function generator for generating sine and cosine functions which is simple, economical, rugged, light, reliable, and moreover of great accuracy. In some respects the present invention is an improvement or adaptation of the electronic multiplier shown in my copending application Serial No. 693,298, filed October 30, 1957, now Patent No. 2,973,146, to which reference should be made.

The present invention is in part based upon an underlying principle that the integral of the area under a sine function is a cosine function, or stated mathematically that:

$$\int_0^a \sin x dx = -\cos x$$

If one switches a sinusoidal reference potential, interrupting the potential at a particular time during each cycle, the time being determined by the value of an independent variable input voltage, and then integrates the remaining, or uninterrupted portion of the sine wave, one may obtain an output voltage which varies as the cosine function of the value of the independent variable input voltage. Further, by application of the principle that cosine $x=\sin(90°-x)$, a sine function generator may be devised. As will be explained further, the range of operation of the device may be varied to suit particular applications by mere re-connection of supply voltages and simple inversion of various other voltages.

It is therefore a primary object of the present invention to provide improved electronic function generating apparatus for providing an output potential which varies as a sine or cosine function of an applied control input potential.

It is another object of the invention to provide simple and economical electronic function generation apparatus for providing sine or cosine function potentials having improved accuracy, reliability and dynamic response.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

Figures 1, 3, 4:
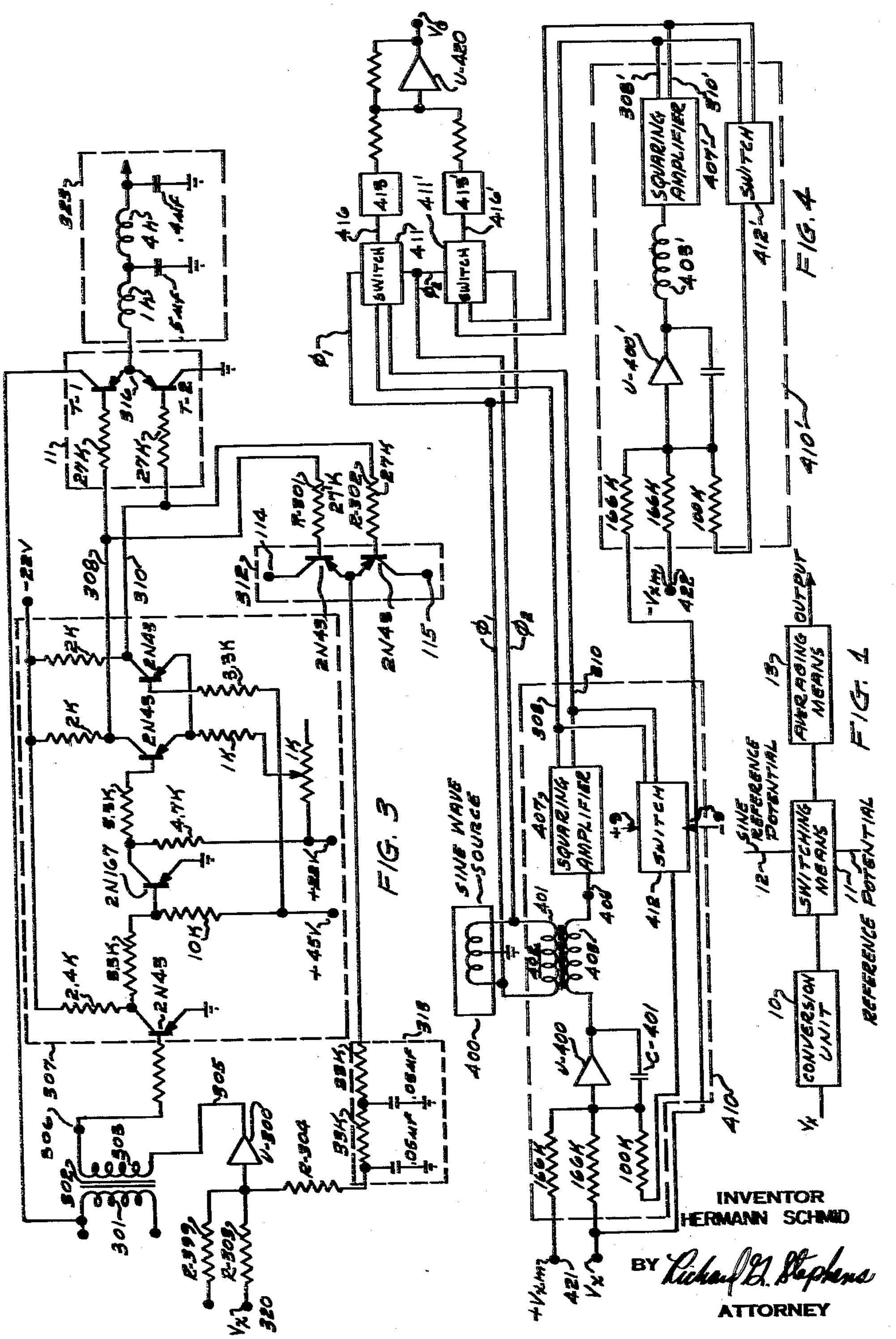

For a fuller understanding of the nature and objects of the invention reference should be had to the following detailed description taken in connection with the accompanying drawings, in which:

FIG. 1 is a simplified functional block diagram useful in illustrating several basic principles underlying the invention;

FIGS. 2*a* through 2*e* are graphs or waveform diagrams illustrating potentials appearing at various portions of various embodiments of the invention during various conditions of operation;

FIG. 3 is an electrical schematic diagram illustrating an exemplary single-ended embodiment of the invention arranged to provide the cosine function; and FIG. 4 is a schematic diagram, partially in block form, illustrating a push-pull embodiment of the invention arranged to provide sine function potentials over an extended range of operation.

Referring now to the simplified functional block diagram of FIG. 1 and the graphical illustrations in FIG. 2 there is shown a conversion unit 10 which receives an input potential $V_x$ commensurate with the magnitude of an independent input variable $x$. The function of conversion unit 10 is to provide time-modulated output signals to control the transfer of a switching means shown in block form at 11. Switching means 11 receives a reference sinusoidal input potential on line 12, and in a first condition of the switch the sinusoidal potential is connected to an integrating or averaging means shown in block form at 13. In a second condition of switching means 11, a reference potential is connected to integrating means 13, and means 13 provides an output potential $V_o$ which varies in accordance with the cosine function of $V_x$ and the independent variable $x$.

FIG. 2*a* shows one cycle of the reference sinusoidal input potential on line 12 as curve 201. If switching means 11 remains in its "first" condition during the entire cycle of the reference sine wave, it will be seen that the average voltage derived from averaging means 13 will be zero, since the sine wave at 201 has positive and negative excursions of equal amplitude and equal duration. Since the value of the cosine function is zero at +90 degrees and −90 degrees, it will be seen that the invention will operate properly at least at those two values if the switching means remains in its "first" condition during each entire reference sine wave cycle whenever the $V_x$ input potential is at its +90 or −90 degree values.

If switching means 11 remains in its "first" condition during only the first half of the reference wave cycle, and then remains in its "second" condition during the second half of the reference sine wave cycle, a voltage such as shown at 202 will be applied to averaging means 13, it being assumed that a reference potential of zero is connected to averaging means 13 during the "second" condition of switching means 11. It will be seen that such operation will apply maximum positive potential to the averaging means, since the entire positive half-cycle of the reference wave will be connected, while none of the negative half cycle will be connected. The potential output from the averaging means under such conditions may be assumed to correspond to 1.000, the maximum value of the cosine function. Thus it will be seen that if switching means 11 may be operated so as to connect the positive half cycle of the reference sine wave to the averaging means and to connect ground or zero potential to the averaging means during the negative half cycle of the sine wave whenever the $V_x$ input potential is at its "zero" value, that the device will operate properly as a cosine function generator at the zero value, since the value of the cosine function at zero degrees is unity. Therefore, assuming that the averaged value of the positive half cycle is 5 volts, the device will operate properly as a cosine function generator if output potentials are obtained as follows:

| | | |
|---|---|---|
| $V_x$ proportional to 0 degrees | $V_o$=5 volts | cos 0°=1.000 |
| $V_x$ proportional to 30 degrees | $V_o$=4.33 volts | cos 30°=.866 |
| $V_x$ proportional to 60 degrees | $V_o$=2.50 volts | cos 60°=.500 |
| $V_x$ proportional to 90 degrees | $V_o$=0.00 volts | cos 90°=0.000 |

An exemplary conversion unit for providing time-modulated output signals is shown in FIG. 3. This unit may comprise exactly the same circuit as that of the conversion unit disclosed and explained in connection with my above mentioned copending application, so it will suffice to give a brief explanation herein. The potential $V_x$ commensurate with the instantaneous value of the independent variable $x$ is applied at terminal 320 via scaling resistance R–303 to the input circuit of a D.C. amplifier U–300, which may comprise any conventional D.C. amplifier. The difference between the input potential applied via R–303 and a feedback potential applied via R–304 is amplified by amplifier U–300 and appears as a direct voltage on conductor 305. This direct voltage is superimposed upon a reference sinusoidal potential. In FIG. 3 the voltage on conductor 305 is shown connected to control the D.C. level of secondary winding 303 of transformer 302. A source of sinusoidal potential (not shown) is connected to primary winding 301 of transformer 302, so that a reference sine wave is induced in secondary winding 303. It will be seen that variation of the voltage on conductor 305 above and below ground level will, in effect, shift the voltage at terminal 306 of winding 303 up and down with respect to ground. If conductor 305 lies at ground potential, it will be seen that the voltage on terminal 306 will be positive with respect to ground for exactly one half-cycle of the reference sine wave and negative with respect to ground for exactly one half-cycle. If conductor 305 lies above ground potential at some positive value, it will be seen that the voltage at terminal 306 will be positive with respect to ground for more than one half-cycle and negative with respect to ground for less than one half-cycle; and conversely, if conductor 305 lies below ground potential at some negative value, the potential at terminal 306 will be positive with respect to ground for less than one half-cycle of the reference sine wave and negative with respect to ground for more than one half-cycle.

A pulse-shaping means shown within dashed lines at 307 as comprising a transistor "squaring" amplifier senses the polarity of the terminal 306 potential with respect to the reference level (ground potential) and provides square or block output pulses on conductors 308 and 310 having time widths which vary in accordance with the polarity condition. Whenever the terminal 306 potential lies above ground potential a "high" voltage exists on conductor 310 and a "low" voltage exists on conductor 308. Conversely, whenever the terminal 306 potential lies below ground potential a "low" exists on conductor 310 and a "high" voltage exists on conductor 308. Since the output voltage from amplifier U–300 governs the D.C. level of the terminal 306 voltage, it will be seen that the relative "high" and "low" time durations of the square pulses on conductors 308 and 310 are governed by the output voltage of amplifier U–300.

The pulses on conductors 308 and 310 are applied via resistors R–301 and R–302 to a limiter means shown within dashed lines at 312 as comprising an emitter-to-emitter connected pair of transistors. Reference voltages of equal magnitude and opposite polarity are connected to the collector electrodes, and briefly described, switching circuit 312 serves to limit accurately the amplitudes of the pulses applied to the circuit and to provide pulses, which after being filtered, will be accurately proportional to the time or width difference between the pulses but independent of their precise amplitudes. For example, assume that the voltage on conductor 308 is +10 volts during its "high" state and −10.2 volts during its "low" state, while the voltage on conductor 310 varies from −11 volts during its "low state" to +9 volts during its "high" state. It will be seen that without amplitude limiting an output voltage would appear at the common emitter terminal even if the "high" and "low" states of each of the conductors were exactly equal in time width. If accurate reference voltages of lesser magnitudes than any of the excursions of the voltages of conductors 308 and 310 are applied to the collector electrodes, limiter circuit 312 will ignore the amplitudes of the pulses when they exceed the reference voltages, making the limiter output voltage at the common emitter terminal dependent solely upon the time widths of the pulses. In the example given, for instance, if positive and negative reference voltages of 8 volts magnitude were applied to the collector electrodes of the limiter circuit, the fact that the "high" and "low" excursions on either one of the conductors were of different magnitudes would be immaterial, and the fact that the corresponding excursions on the two conductors differed slightly also would be immaterial.

Limiter circuit 312 provides a direct feedback potential to amplifier U–300 which varies in accordance with the time modulation effected by the superimposed alternating and direct voltages at terminal 306 and squaring amplifier 307. If the "high" and "low" states of conductors 308 and 310 are of equal duration, zero feedback voltage will be applied from filter 313 to the input circuit of amplifier U–300, since a negative pulse of given duration from one of the transistors of limiter 312 during one half-cycle of the reference alternating sine wave will be counteracted by a positive pulse of the same duration from the other transistor of limiter 312 during the other half-cycle of the reference sine wave, and filter 313 will average these two opposite-polarity pulses so as to provide zero feedback voltage.

Assuming temporarily for ease of analysis that a sawtooth reference wave is being applied to transformer 301 rather than a sine wave, designating the amplitude of the sawtooth wave as $E_m$, the period of one cycle of the sawtooth reference as T, the period or width of the "high" state on conductor 308 as $t$, and the direct voltage on conductor 305 as $V_b$, the following relationship may be seen:

$$t=\frac{T}{2}\left(\frac{E_m+V_b}{E_m}\right)$$

or $$\frac{t}{T}=\frac{1}{2}\left(1+\frac{V_b}{E_m}\right) \quad (1)$$

The demodulated or mean level value of the pulses applied to limiter 312 may be seen to be related to the filtered feedback voltage present at resistor R–304 in the following manner:

$$V_f=-V_r\left(1-\frac{2t}{T}\right) \quad (2)$$

wherein $V_f$ is the feedback voltage and $V_r$ is the limiter circuit pulse limiting level. Substituting $t/T$ as defined in Equation 1 into Equation 2:

$$V_f = -V_r\left[1-\frac{2}{2}\left(\frac{1+V_b}{E_m}\right)\right]$$

or, $$V_f = \frac{V_r V_b}{E_m} \qquad (3)$$

The D.C. level or bias voltage $V_b$ on conductor 305 may be seen to be proportional to the resultant input voltage applied to amplifier U–300 multiplied by the gain A of the amplifier. The resultant input voltage may be seen to be proportional to the sum of the $x$ independent variable input voltage $V_x$ applied at terminal 320 and the feedback voltage applied via resistor R–304. Therefore, if $V_f$ in Equation 3 is replaced by $$\frac{V_r V_b}{E_m}$$

$$V_b = (V_x + V_f)A = AV_x + \frac{AV_rV_b}{E_m} \qquad (4)$$

$$V_b = \frac{AV_x}{1-\frac{AV_r}{E_m}} \qquad (5)$$

Substituting the expression of Equation 5 for $V_b$ into Equation 1:

$$1-\frac{2t}{T} = 1-\frac{2}{2}\left(1+\frac{V_b}{E_m}\right) = \frac{\frac{AV_x}{1-\frac{AV_r}{E_m}}}{E_m} \qquad (6)$$

Multiplying through by $E_m$:

$$1-2\frac{t}{T} = \frac{AV_x}{E_m - AV_r} \qquad (7)$$

If amplifier U–300 is provided with high gain, of the order of several thousand or higher, $E_m$ may be made to be insignificant compared to $AV_r$ in the denominator in Equation 7, so that Equation 7 may be written with negligible error as follows:

$$\left(1-2\frac{t}{T}\right) = \frac{-V_x}{V_r}k \qquad (8)$$

where $k$ is a scaling constant.

From Equation 8 it may be seen that the time modulation $$\left(1-\frac{2t}{T}\right)$$

on conductors 308 and 310 is directly proportional to $V_x$, the $x$ independent variable input potential, and inversely proportional to $V_r$, the reference voltage amplitude selected for limiter circuit 312. Thus if high gain is provided in the loop circuit shown, the time modulation $$\left(1-2\frac{t}{T}\right)$$

will be seen to be independent of the amplitude, distortion and frequency of the reference sine wave. Since the conversion unit is connected in a closed loop as shown, the reference signal which is superimposed on the $x$-variable input signal need not be of critical shape, as shown in the above analysis. Thus, one may apply sawtooth voltages to transformer 302 instead of sine voltages, if desired. However, reference sine voltages are used elsewhere in the invention, and it is far more convenient and economical to use the same voltages to operate the conversion unit, and use of a single reference voltage automatically synchronizes the conversion unit with the switching means. The amplitude and distortion of the reference sine wave should be carefully controlled, however, for reasons to be discussed below.

At this point it should be apparent to those skilled in the art that the output of the amplifier circuit U–300 depends upon the value of the reference voltages applied to limiter 312. Variation of the feedback voltage of a feedback amplifier has an inverse effect on amplifier output. Thus it may be seen that by varying the limiter collector voltages in accordance with a further independent variable the pulse modulation effected by the conversion unit will be made commensurate with the ratio between the $x$ variable and the further variable, which may be termed the $y$ variable. Thus the devices shown may be operated to provide sine and cosine functions of ratios between two voltages as well as in the single-variable manner described above.

As well as being connected in the feedback loop described above, the time-modulated pulses on conductors 308 and 310 are applied to a transistor switching circuit shown within dashed lines at 11. It may be seen that switching circuit 11 is shown as comprising a pair of PNP transistors connected emitter-to-emitter in the same manner as limiter circuit 312. The operation of switching circuit 11 is similar to that of an ideal single-pole double-throw switch. When transistor T–1 is caused to conduct transistor T–2 is caused to be cut off, and the common emitter terminal assumes a voltage almost exactly equal to that of the T–1 collector. When transistor T–2 is caused to conduct transistor T–1 is caused to be cut off, and the common emitter terminal assumes a voltage almost exactly equal to that of the T–2 collector. An important fact that allows great accuracy by use of the present invention is that only an extremely small voltage drop, of the order of one-millivolt, exists between the emitter and collector of the conducting transistor, while an extremely high resistance, of the order of ten megohms, exists between the emitter and collector of the non-conducting transistor.

As shown in FIG. 3, the reference sine wave potential is also applied to the collector electrode of transistor T–1, while ground potential is connected to the collector of transistor T–2. When transistor T–1 conducts and transistor T–2 is cut off, the reference sine wave appears at the common emitter output terminal 316. When transistor T–2 conducts and transistor T–1 is cut off, ground or reference potential is applied to emitter terminal 316. Now it will be seen that the transistor switch 11 shown in FIG. 3 is capable of performing the functions of the switch 11 discussed above with relation to FIG. 1 if the time-modulated signals on conductors 308 and 310 are properly phased so as to operate transistors T–1 and T–2. One cycle of the reference sine wave, which is also the voltage on the collector electrode of transistor T–1, is shown plotted as curve 203 in FIG. 2*a*. Assume that zero input potential $V_x$ is present at input terminal 320, so that the D.C. level of terminal 306 is zero and ultimately that the "high" and "low" states of the square pulses on conductors 308 and 310 each have time widths exactly one-half cycle of the reference sine wave, as shown at 204 and 205 in FIG. 2*b*. As conductor 308 goes "low" during the first half cycle, or time $t$, it will be seen that the collector-base junction of transistor T–1 will become forward-biased, and with the emitter-base junction also forward-biased transistor T–1 will conduct, and the T–1 collector voltage, the reference sine wave half-cycle, will appear at terminal 316 (less the small millivolt drop mentioned above, which may be neglected). During the same half-cycle conductor 310 drives the base electrode of transistor T–2 "high," so that the collector-base and emitter-base junctions of transistor T–2 are both reverse-biased, cutting off transistor T–2. During the second half-cycle, or time $t'$ in FIG. 2*b*, conductor 308 will be "high" and conductor 310 will be "low," and the symmetry of the switching circuit makes it apparent that the converse condition will occur, with transistor T–2 conducting and transistor T–1 cut off. With the collector-base junction of transistor T–2 forward-biased, the ground potential on the T–2 collector electrode (less the small millivolt error) will appear at terminal 316 throughout time $t'$. Now it will be seen that with zero input potential, the device provides maximum output potential, and hence operates correctly as a cosine function generator.

Now assume that a direct input potential $V_x$ having a magnitude such as shown in FIG. 2*c* at 206 is applied to the input terminal, providing time modulation such as shown by waves 207 and 208. During time $t$ transistor T–1 will connect the sine wave to terminal 316, and during time $t'$ transistor T–2 will connect the reference potential (ground) to terminal 316, providing an input potential to averaging means 13 of the nature shown at 209. If $V_x$ is increased during successive cycles, so that time $t$ lengthens and time $t'$ shortens, it will be seen that smaller average voltages will be applied to averaging means 13. If $V_x$ is increased to a value such that time $t$ comprises the entire sine wave cycle, and time $t'$ does not occur, the reference sine wave will be connected continuously to terminal 316, and the averaged sinusoidal voltage from averaging means 13 will be zero. This corresponds to proper cosine function generation at 90 degrees, and occurs when the direct bias voltage on conductor 305 equals the peak value $E_m$ of the sine wave induced in secondary winding 303. This condition is one limit of the range of operation of the device of FIG. 3, and further increasing the input voltage $V_x$ will not provide cosine generation beyond 90 degrees, since the transistor switching means 11 will not be affected. If an opposite polarity input potential $-V_x$ is applied to input terminal 320, time modulation such as shown at 210 and 211 will occur, with the time $t$ periods being shortened and the time $t'$ periods being lengthened; so that the average of a wave such as shown at 212 is provided at the input terminal of averaging means 13. When the direct voltage on conductor 305 equals $E_m$, the peak value of the reference sine wave at terminal 306, the opposite limit, −90 degrees, of the range of operation is reached. Now it will be seen that the device of FIG. 1 operates properly as a cosine function generator throughout the range from +90 degrees to −90 degrees, or throughout the first and fourth quadrants.

Since cos $c=\sin(90°-x)$, the basic cosine function generator of FIG. 3 may be made to operate as a sine function generator merely by applying a constant direct voltage equal to the full scale or $E_m$ value of $V_x$ to the input circuit of amplifier U–300, via scaling resistor R–399, for example, so that the full scale value $V_{xm}$ is superimposed upon the $V_x$ input signal and the reference sine wave. It was shown above that zero output voltage would be obtained from the device of FIG. 3 when $V_x$ equaled $E_m$, so it will be seen that zero output voltage will be obtained if $V_x$ is zero if an additional $V_{xm}$ voltage is applied as suggested. Then, as $V_x$ increases in a direction so as to subtract from $V_{xm}$, a sine function will be generated throughout two quadrants. $V_x$ may be increased from zero to a value of $-2V_{xm}$, providing sine generation throughout the first and second quadrants. Now, if instead, an opposite polarity $V_{xm}$ voltage is added via resistor R–399, and if the signals to switching circuit 11 are reversed, so that T–1 conducts during time $t'$ and T–2 during time $t$, it will be seen that the device of FIG. 3 will provide outputs having proper polarities through the fourth and third quadrants, i.e., from 0 to −180 degrees. The switching signals may be reversed simply by connecting conductor 308 to the base of transistor T–2 and conductor 310 to the base of T–1. Instead, if desired, opposite conductivity type transistors could be substituted to provide the same effect. Also, inversion of the reference signal applied to switch 11 will provide the same effect. If no opposite $V_{xm}$ voltage is added, it will be seen that the device acts as a cosine generator throughout the second and third quadrants. Thus it will be seen that by various connections the basic device may be operated to provide a sine function or a cosine function over any desired quadrant.

Numerous applications require sine or cosine function generation through more than a single quadrant or more than two quadrants, however, an advantageous feature of the present invention is that several of the basic devices of FIG. 3 may be connected in parallel to provide operation through additional quadrants. To provide sine function generation from 0° through ±180°, two of the basic devices may be connected in parallel, as shown in FIG. 4. If desired, further similar devices also may be connected in parallel to operate through further quadrants. The basic cosine generator of FIG. 3 operates between ±90 degrees, and, as shown above, the output voltage will remain at zero if an attempt is made to drive the function generator beyond these limits. However, additional devices identical to that shown may be connected in parallel, and biased to begin operation at +90 degrees or −90 degrees so as to extend the range of operation. As many devices as desired may be connected in parallel to provide function generation throughout as great a range as desired. If two such devices are connected in parallel one will not interfere with the other, since the output voltage from one device will be zero when the other device is providing an output. This ability to allow parallel connection without interference or interaction eliminates the need for additional switching circuitry required if attempts are made to connect certain prior art devices in parallel to extend the computation range.

FIG. 4 illustrates a practical embodiment of the invention connected to operate as a sine function generator from 0 through ±180° with the transistor switching circuits connected in push-pull fashion. The conversion units 410 and 410' are shown substantially as in FIG. 3, with certain portions shown in block form for sake of simplicity. Positive and negative $V_{xm}$ voltage of constant magnitude are applied from the power supply (not shown) to terminals 421 and 422 to make each channel of the device act as a sine generator as explained above. The modulated pulses from switches 412 and 412' are averaged by filter means shown in FIG. 4 as connected in the amplifier circuits rather than by separate external filters such as 313 in FIG. 3, but either technique may be employed. Those skilled in the art will recognize that connection of a capacitor between input and output terminals of an amplifier will cause the amplifier to integrate or smooth pulses applied to the amplifier input circuit.

The reference sine wave is applied from a source, such as an oscillator, to primary winding 401 of transformer 402, inducing reference sine potentials in secondary winding 403 in the upper channel and in secondary winding 403' in the lower channel. Secondary winding 403' preferably comprises a further secondary winding on transformer 402, although it is shown separated in FIG. 4 for cake of clarity. As shown in FIG. 4, the center-tap of the sine wave supply is grounded. The alternating sinusoidal potentials $\phi_1$ and $\phi_2$ of opposite instantaneous polarity at the end terminals of the source are connected to the collector electrodes of switches 411 and 411', thereby applying push-pull rather than single-ended reference sine waves to the switches, which may be identical in structure to the switching circuit shown at 11 and 312 in FIG. 3. The operating signals applied to switch 411 via conductors 308 and 310 determine whether the common emitter output terminal 416 receives the $\phi_1$ phase of the reference sine wave or the $\phi_2$ phase of the sine wave. When the $V_x$ input signal is negative and exactly cancels the $V_{xm}$ constant input voltage, the D.C. level at terminal 406 will be seen to be zero, so that the "high" and "low" states of conductors 308 and 310 will be of equal time duration. Under such conditions switch 411 will connect the $\phi_1$ sine wave to terminal 416 during time $t$, and will connect the opposite polarity $\phi_2$ phase during time $t'$, and since times $t$ and $t'$ are of equal duration, and since sine waves $\phi_1$ and $\phi_2$ are of equal magnitude and of the same polarity at their times of connection, averaging the potential at 416, as by means of filter 413, will provide maximum output voltage from filter 413. This maximum voltage will comprise the average of two successive half-cycles of the same polarity, as shown at 216 in FIG. 2*d*. During this mode of operation, the negative $V_x$ signal will have added to the $-V_{xm}$ signal to drive the conversion unit 410' of the lower channel beyond its range of operation, so that the same phase of the reference source is continuously connected by switch 411' to filter 413', providing a zero output voltage from filter 413'. The lower channel will be biased to one end of its operating range by the constant negative $V_{xm}$ potential at terminal 422, so that no output will appear from filter 413' unless the $V_x$ input voltage is positive.

FIG. 2 illustrates typical operation when the $V_x$ input signal is negative, but of a magnitude less than $+V_{xm}$. It will be seen that the resultant output signal at 406 will be negative, providing time $t$ periods lesser in width than one half-cycle and time $t'$ periods greater in width than one half-cycle. The $\phi_1$ and $\phi_2$ reference voltages are shown plotted in FIG. 2*d*. Since switch 411 selects the $\phi_1$ potential during time $t$ and the $\phi_2$ potential during time $t'$, the voltage at terminal 416 will be as shown at 213. When the $V_x$ input signal becomes zero, time $t_1$ will become zero and time $t'_1$ will become maximum, so that voltage $\phi_2$ will appear at terminal 416, providing zero output from filter 413. When the $V_x$ signal goes positive, switch 411 will connect one reference sine phase continuously to filter 413, providing zero output.

Push-pull operation of the nature described provides a considerable increase in accuracy, as well as larger output signals. If non-linearities exist in the circuit components or the reference sine potential, errors introduced during one half of the reference sine cycle tend to be compensated for during the other half of the cycle. For example, push-pull operation tends to make transistor matching far less critical, so that minor differences in the characteristics of the transistors in switching means 11 have less adverse effect on accuracy.

While FIG. 4 illustrates the push-pull form of the invention in a two channel version, a single channel version also may use push-pull switch operation, and while FIG. 4 illustrates a sine function generator, it will be apparent that push-pull switch operation may be utilized in a cosine generator embodiment of the invention.

The output signals from filters 413 and 413' in FIG. 4 may be connected in parallel-adding connection to the input circuit of a utilization device, which is shown in FIG. 4 as comprising a conventional summing amplifier U–420; but which, of course, could comprise numerous other devices depending upon the particular machine in which the invention is to be used.

While FIG. 3 illustrates a basic circuit in which cosine function generation is provided throughout a range of ±90°, this basic circuit may be altered so as to operate over a range from 0 to +180° by altering the phase relationship between the time-modulated pulses from the conversion unit and the reference potential applied to switching means 11. For example, a 90° phase shifter (not shown) may be connected between primary winding 301 and the collector electrode of transistor T–1. Alternatively, a 90° phase shifter may be inserted as at terminal 306 to shift the time modulation of the converter unit. Such phase shifters may comprise, for example, conventional operational amplifier integrators. Operation of the circuit with such phase shift introduced should be readily deducible at this point without detailed explanation.

In each of the circuits shown, the time-modulated signals must be properly synchronized with reference potentials applied to the switches. Phase correction and time delay devices of well-known construction may be inserted where necessary in order to provide accurate synchronization. The filters shown may be of conventional design. The circuit values shown in FIG. 3 are exemplary only but illustrate a practical embodiment of the invention. D.C. amplifier U–300 had a voltage gain of approximately 40,000. A reference sine wave of 1000 cycles per second was used. The reference source supplying switching means 11 should be of fairly low impedance, of the order of 50 ohms or less for the circuit values shown. A variety of alternative circuits may be substituted for the squaring amplifier shown at 307 without departing from the invention. It will be obvious to those skilled in the art that opposite conductivity type semiconductors may be substituted with appropriate polarity reversals.

The invention accordingly comprises the features of construction, combinations of elements, and arrangement of parts, which will be exemplified in the constructions hereinafter set forth, and the scope of the invention will be indicated in the claims.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Electronic function generating apparatus for providing an output potential which varies in accordance with a trigonometric function of the magnitude of an independent variable input potential, comprising in combination, a source of reference sine wave potential, means for modulating said input potential to provide control pulses which are synchronized with said reference sine wave potential and which vary in time width in accordance with the magnitude of said input potential, a potential averaging circuit, and an electronic switching circuit controlled by said control pulses and operative to connect said sine wave potential to said averaging means for time periods commensurate with the time widths of said control pulses.

2. Electronic function generating apparatus for providing a direct output potential which varies in accordance with a trigonometric function of the magnitude and polarity of an independent variable input potential, comprising in combination, a source of reference sine wave potential; means for combining said sine wave potential and said variable input potential to provide a composite potential; means for detecting the polarity of said composite potential with respect to a reference level and for providing bi-valued control pulses in accordance with the polarity of said composite potential; a pair of emitter-to-emitter connected transistors each having a base, an emitter and a collector electrode, said sine wave potential being connected between said collector electrodes of said transistors and said bi-valued control pulses being connected to said base electrodes, and a low-pass filter connected to said emitter electrodes to provide said direct output potential.

3. Electronic function generation apparatus for providing an output potential which varies in accordance with the cosine function of the magnitude and polarity of an independent variable input potential, comprising in combination, a source of reference sine wave potential, a direct current amplifier connected to receive said variable input potential and a feedback potential and to provide a direct amplifier output potential, means for combining said sine wave potential and said amplifier output potential to provide a composite potential, means for detecting the polarity of said composite potential with respect to a reference level and for providing a pair of inversely-related trains of bi-valued pulses, one of said trains of pulses comprising a potential which is low when said composite potential is positive with respect to said reference level and high when said composite potential is negative with respect to said reference level, a pair of emitter-to-emitter connected transistors connected to receive said bi-valued pulses and to provide a second potential which varies in accordance with the relative time widths of the high and low conditions of said pulses, means for filtering said second potential to provide said feedback potential, a further pair of emitter-to-emitter connected transistors connected to said bi-valued pulses and to said reference sine wave potential and operative to apply said sine wave potential to an averaging means for time periods dependent upon the relative time widths of said high and low conditions of said pulses.

4. Electronic function generating apparatus comprising in combination, a source of reference sine wave potential, an independently variable input potential, means for combining said sine wave potential and said variable input potential to provide a composite potential, time-modulation means for detecting the instantaneous polarity of said composite potential with respect to a reference potential level and for providing time-modulated square wave pulses which vary in accordance with said polarity, a transistor switching circuit connected to said square wave pulses and to said sine wave potential, and a potential averaging means connected to said switching circuit to provide an output potential.

5. Apparatus according to claim 4 in which said means for combining said potentials comprises a transformer, said reference sine wave potential being induced in a winding of said transformer and said variable input potential being applied to said winding to determine the potential level of said winding with respect to said reference potential level.

6. Apparatus according to claim 4 in which said sine wave potential and said variable input potential are combined in an amplifier circuit, said amplifier circuit including means for demodulating said time-modulated square wave pulses to provide an amplifier feedback potential.

7. Apparatus according to claim 4 in which said transistor switching circuit comprises a pair of similar conductivity type emitter-to-emitter connected transistors each having a base, an emitter and a collector electrode, said reference sine wave potential being applied to one of said collector electrodes and said reference potential level being connected to the other of said collector electrodes, said time-modulated pulses being connected to said base electrodes, and said emitter electrodes being connected to said potential averaging means.

8. Apparatus according to claim 4 having a second sine wave potential opposite in polarity to said reference sine wave potential, and in which said transistor switching circuit comprises a pair of emitter-to-emitter connected transistors each having a base, an emitter and a collector electrode, said reference sine wave potential being applied to one collector electrode and said second sine wave potential being applied to the other collector electrode, said time-modulated pulses being connected to said potential averaging means.

9. Apparatus according to claim 4 in which said time-modulation means provides a first potential which alternates bebtween two potential levels in accordance with the instantaneous polarity of said composite potential, and a second potential which alternates between two potential levels in inverse manner to said first potential, said transistor switching circuit comprising first and second transistors, said first and said potentials being applied individually to said first and second transistors to cause said transistors to alternate oppositely between conduction and cutoff as said first and second potentials alternate between their two potential levels.

10. Apparatus according to claim 4 having means for adding a constant potential to said independently variable input potential.

11. Apparatus according to claim 6 in which said means for demodulating said time-modulated rectangular pulses includes means for limiting said pulses to a selected amplitude.

12. Apparatus according to claim 4 in which said time modulation means comprises a limiting amplifier connected to said composite potential and said reference potential level, and operative to amplify the difference in potential between said composite potential and said reference potential level.

13. Electronic function generating apparatus comprising first and second function generator circuits connected in parallel circuit relationship to a utilization device; each of said function generator circuits comprising means for combining an independent variable input potential, a reference sine wave potential and one of two constant biasing potentials to provide a composite potential, means for detecting the instantaneous polarity of said composite potential with respect to a reference level and for providing time-modulated rectangular pulses having time widths which vary in accordance with said instantaneous polarity, a transistor switching circuit connected to said rectangular pulses and to said sine wave potential, and a potential-averaging means connected to said switching circuit to provide an output potential.

14. Apparatus according to claim 13 in which each of said means for combining said potentials includes an individual amplifier circuit, each of said amplifier circuits including means for demodulating the rectangular pulses individual to its function generator circuit to provide a feedback potential for its respective amplifier.

15. Apparatus according to claim 11 in which said means for demodulating said time-modulated rectangular pulses comprises a second transistor switching circuit connected to apply a first or second direct reference potential to second potential averaging means for time periods in accordance with the polarity of said composite potential with respect to said reference level.

16. Electronic function generating apparatus for providing an output potential which varies in accordance with a trigonometric function of an independent variable input potential, comprising in combination, a source of first and second constant potentials, a source of reference sine potential; a source of second sine wave potential, a first function generating circuit comprising means for superimposing said first constant potential, said variable input potential and said reference sine wave potential to provide a first composite potential, time-modulation means for detecting the instantaneous polarity of said first composite potential with respect to a reference level and for providing push-pull time-modulated square wave pulses which vary in time width in accordance with said polarity, a first transistor switching circuit connected to said square wave pulses and comprising first and second transistors, said reference sine wave potential and said second sine wave potential being connected across said first and second transistors, said square wave pulses being connected to cause said first of said transistors to conduct and said second of said transistors to be cut off when said first composite potential is of a given polarity with respect to said reference level, and to cause said second of said transistors to conduct and said first of said transistors to be cut off when said first composite potential is of opposite polarity with respect to said reference level, a filter circuit connected to said two transistors, the one of said first and second transistors which is conducting at any given instant being operative to apply the instantaneous sine wave potential to which it is connected to said filter circuit; a second function generating circuit similar to said first function generating circuit, said second function generating circuit being responsive to said second constant potential, said sine wave potentials and said variable input potential, said first and second function generating circuits being connected in parallel circuit relationship to a utilization device.

(References on following page)

References Cited in the file of this patent

UNITED STATES PATENTS 2,773,641 Baum ---------------- Dec. 11, 1956

OTHER REFERENCES

"Electronic Analog Computers" (Korn and Korn), 1952. Published by McGraw-Hill Book Co., Inc., N.Y. Fig. 6.12*a*, p. 224 relied on.

"Electronic Engineering Principles" (Ryder), 1952. Prentice-Hall Inc., New York. Figs 13–16, p. 421 relied on.